Jan. 13, 1959  H. S. HARRISON  2,868,354
TROLLEY CONVEYOR INCORPORATING AUTOMATIC LOAD TRANSFER
Filed Aug. 7, 1953
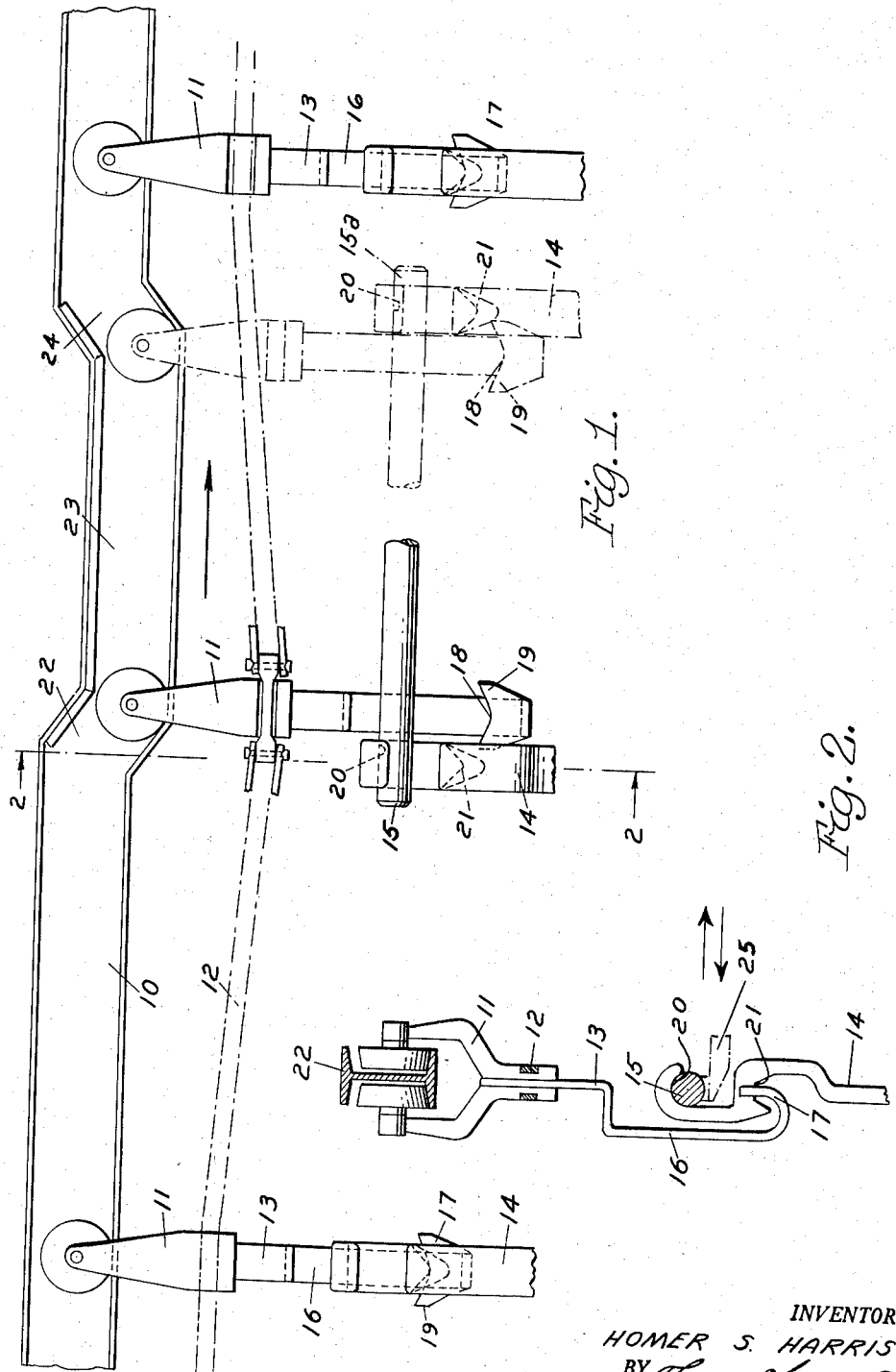
INVENTOR.
HOMER S. HARRISON
BY
Attys.

United States Patent Office 2,868,354
Patented Jan. 13, 1959

2,868,354

TROLLEY CONVEYOR INCORPORATING AUTOMATIC LOAD TRANSFER

Homer S. Harrison, Detroit, Mich., assignor to Allied Steel and Conveyors, Inc., Detroit, Mich., a corporation of Michigan Application August 7, 1953, Serial No. 372,885

11 Claims. (Cl. 198—177)

This invention relates to a power trolley conveyor system incorporating automatic load pickup and delivery features.

Requirements are frequently encountered in industrial overhead power conveyor systems for performing local operations on the work loads which render it desirable for loads carried along overhead trolley conveyors to be temporarily deposited and/or picked up at one or more particular work stations. Various forms of mechanical transfer apparatus have been devised for removing work loads from a traveling conveyor as well as for depositing loads onto such moving conveyor.

The present invention contemplates the automatic delivery of loads from a moving conveyor to a receiving member at a work station as well as the automatic pickup of loads from the same or a comparable loading member by the moving conveyor accomplished entirely through the movement and operation of chain driven trolleys without resort to other mechanical devices for removing the loads from the trolleys or replacing them thereon. Essential features of the present unloading system comprise a dip in the trolley conveyor track at an unloading station, a trolley hook, a disengageable load hook carried by the trolley hook adapted to engage a receiving member at such unloading station as the associated trolley passes through the track dip, the trolley hook being adapted to disengage the load hook leaving the load deposited on the receiving member. In order to adapt the system to load pickup, the trolley hook is constructed to similarly engage a load hook deposited on the loading member while the trolley negotiates a corresponding rise in the conveyor track in a manner effective to transfer the load from the loading member to the moving trolley hook.

The receiving and loading members may be a part of any auxiliary mechanism for moving the loads to and from a work station for performing any desired operation on the work load. The operation of such auxiliary mechanism forms no part of the present invention other than in providing receiving and loading members in the path of the power conveyor which members are stationary during unloading and pickup operations. Accordingly, it is the principal object of the present invention to provide a simple trolley conveyor system incorporating means for automatically depositing and picking up loads at predetermined unloading and pickup points.

Another object is to provide such system wherein a dip in power driven trolley conveyor track is employed to effect an unloading operation and a corresponding rise in conveyor track is employed to effect a pickup operation.

Another object is to provide trolley and load hook constructions equally adaptable to pickup and delivery operations during forward travel of the trolley.

Another object is to provide a load hook construction adaptable to transfer engagement with a trolley hook and stationary member simply through change in trolley level during forward travel of the conveyor.

Another object is to provide trolley hook and load hook constructions adapted to centralize engagement suspension points with the vertical center plane of conveyor travel.

Another object is to provide a trolley conveyor system wherein a given chain driven trolley is adapted to sequentially deposit one load and pick up another load through the provision of a single depressed section in the conveyor track extending between the respective deposit and pickup points.

These and other objects will be apparent from the following detailed description of a particular embodiment and by reference to the drawings disclosing such embodiment wherein:

Fig. 1 is a side elevation of a section of a trolley conveyor system incorporating unloading and pickup points.

Fig. 2 is a sectional view taken along the line 2—2 of Fig. 1 with the trolley shown at the moment of simultaneous transfer engagement.

Referring to Fig. 1 it will be seen that the system comprises a conveyor track 10, a plurality of wheeled trolleys 11 propelled by a conveyor chain 12, a hook 13 carried by each of the trolleys, a plurality of load hooks 14, and a member 15 engageable by the load hooks at an unloading point and the same or similar member 15a for holding the load hook at a pickup point.

The trolley hook 13 is constructed with a laterally offset portion 16 and a laterally facing hook end 17 located directly below the center line of the trolley conveyor, such hook end having a central engagement recess 18 defined by upwardly extending projections 19 on either side thereof. The load hook 14 is provided with two vertically spaced, oppositely faced hook recesses 20 and 21, the latter being adapted to engage the hook recess 18 of the trolley hook 16 while the former is adapted to engage the member 15 which in the present illustration is a cylindrical bar extending longitudinally below the center line of the conveyor track. As best shown in Fig. 2, the center line of the load hook and each of the engagement recesses of the load hook and trolley hook lie in the same vertical plane extending through the center line of the conveyor track while each of the respective hook recesses face in a lateral direction to accommodate delivery and pickup operations as will now be described.

As a given trolley with load hook advances from left to right as seen in Fig. 1 and the trolley approaches a dip 22 in the conveyor track, the load hook recess 20 will pass over the end of the member 15. As the trolley then moves down the inclined section 22 of the conveyor track, the load hook will first engage the member 15 when the trolley is approximately one-third down the incline, which constitutes the transfer point of simultaneous engagement shown in Fig. 2. During the next one-third downward travel of the trolley the hook projections 19 will move to approximately the level of the load hook recess 21 and the remaining downward travel will provide surplus passing clearance between the trolley and load hooks. Thus adequate clearances for manufacturing tolerances are provided to assure that the load hook recess 20 will readily pass over the end of the receiving member 15 and that the hook projections 19 will readily pass under the load hook recess 21 upon completion of the unloading operation.

The angle of the hook extension 19 is made smaller than the downward angle of the inclined section 22 so as to effect a transfer without relative scraping movement either between the hook recess 20 and member 15 or between the rear projection 19 and hook recess 21.

As the trolley then advances along the depressed section 23 in the conveyor track and approaches another load hook deposited on a member 15a for pickup, the leading projection 19 of the trolley hook will pass under the recess 21 of the load hook and as the trolley advances up the inclined section 24 of the conveyor track, the trolley hook recess 18 will engage the load hook recess 21 and raise the load hook off of the member 15a.

The traveling speed of the conveyor trolleys 11 may be synchronized with the working cycle of a common receiving and loading member 15 (moved by any auxiliary apparatus 25) to permit the same trolley which delivers a load at one end of the member 15 to pick up another load, on which the work operation has been completed, at the other end of such member.

While a particular embodiment has been disclosed in detail, it will be understood that numerous modifications might be resorted to without departing from the scope of my invention as defined in the following claims.

I claim:

1. An overhead trolley conveyor and load transfer system comprising a conveyor track, an inclined section in said conveyor track, a transfer member under said inclined section, a conveyor trolley for traveling on said track, a hook on said trolley facing laterally relative to the direction of conveyor travel, and a load hook having means adapted to engage respectively said trolley hook and said member and to be transferred therebetween through the change in level of said trolley hook in passing along said inclined section, one of the interengaging trolley and load hooks having projections in a plane parallel to conveyor travel for resisting horizontal disengagement with said hooks.

2. A conveyor system as set forth in claim 1 wherein the respective engaging points between said trolley and load hooks and between said member and load hook lie in a common vertical plane containing the center line of said conveyor track.

3. A conveyor system as set forth in claim 1 wherein said trolley hook is provided with a laterally offset portion and a hook end portion, the engaging surface of said hook end lying in a vertical plane containing the center line of said conveyor track.

4. A conveyor system as set forth in claim 1 wherein said load hook is provided with a pair of laterally facing hook elements for respectively engaging said trolley hook and said member.

5. A conveyor system as set forth in claim 1 wherein one of the interengaging trolley and load hooks is provided with a central recess and projections on either side thereof extending in a plane parallel to conveyor travel.

6. A conveyor system as set forth in claim 1 wherein one of the interengaging trolley and load hooks is provided with a central recess and projections on either side thereof extending in a plane parallel to conveyor travel, and the other of said hooks extends laterally across said recess.

7. A conveyor system as set forth in claim 1 wherein one of the interengaging trolley and load hooks is provided with a central recess and projections on either side thereof extending in a plane parallel to conveyor travel, the surface of said projections extending an angle smaller than the angle of inclination of said section of conveyor track.

8. A conveyor system as set forth in claim 1 wherein said load hook is provided with a pair of vertically spaced hook elements for respectively engaging said trolley hook and said member.

9. A conveyor system as set forth in claim 1 wherein said load hook is provided with a pair of vertically spaced, laterally extending hook elements for respectively engaging said trolley hook and said member.

10. A trolley conveyor and load transfer system comprising a generally horizontal conveyor track, a depressed section in said conveyor track, downwardly and upwardly inclined sections leading to and from said depressed section, a load receiving member under said downwardly inclined section, a member for holding a load to be picked up under said upwardly inclined section, a plurality of power driven trolleys each having a laterally facing hook, a plurality of load hooks each having means for respectively engaging said trolley hook and either said load receiving or load holding member, said load hooks being engageable with said trolley hooks to effect a transfer of a load hook from a trolley hook to said receiving member during the travel of said trolley on said downwardly inclined section, and to effect a transfer of a load hook positioned on said load holding member to a passing empty trolley hook during the travel of said trolley on said upwardly inclined section.

11. An overhead trolley conveyor and load transfer system comprising a conveyor track, an inclined section in said conveyor track, a transfer member under said inclined section, a conveyor trolley for traveling on said track, a hook on said trolley facing laterally relative to the direction of conveyor travel, and a load hook having means adapted to engage respectively said trolley hook and said member to be transferred therebetween through the change in level of said trolley hook in passing along said inclined section, and the respective engaging points between said trolley and load hooks and between said member and load hook lie in a common vertical plane containing the center line of said conveyor track.

References Cited in the file of this patent
UNITED STATES PATENTS

| | | |
|---|---|---|
| 570,025 | Kennedy et al. | Oct. 27, 1896 |
| 2,229,002 | Cowey | Jan. 14, 1941 |
| 2,609,083 | Leach | Sept. 2, 1952 |
| 2,651,401 | Vincent | Sept. 8, 1953 |